United States Patent
Na

(10) Patent No.: US 11,585,768 B1
(45) Date of Patent: Feb. 21, 2023

(54) SYSTEM AND METHOD FOR INSPECTING DEFECTS OF STRUCTURE BY USING X-RAY

(71) Applicant: NEUF Inc., Suncheon-si (KR)

(72) Inventor: Myoung Chan Na, Yeosu-si (KR)

(73) Assignee: NEUF Inc., Suncheon-si (KR)

( * ) Notice: Subject to any disclaimer, the term of this patent is extended or adjusted under 35 U.S.C. 154(b) by 0 days.

(21) Appl. No.: 17/891,127

(22) Filed: Aug. 18, 2022

(30) Foreign Application Priority Data

| Aug. 24, 2021 | (KR) | 10-2021-0111611 |
| Aug. 24, 2021 | (KR) | 10-2021-0111615 |
| Aug. 24, 2021 | (KR) | 10-2021-0111620 |

(51) Int. Cl.
*G01N 23/00* (2006.01)
*G01N 23/083* (2018.01)
*G01N 23/04* (2018.01)

(52) U.S. Cl.
CPC .......... *G01N 23/083* (2013.01); *G01N 23/04* (2013.01); *G01N 2223/04* (2013.01); *G01N 2223/20* (2013.01); *G01N 2223/3303* (2013.01); *G01N 2223/40* (2013.01); *G01N 2223/646* (2013.01)

(58) Field of Classification Search
None
See application file for complete search history.

(56) References Cited

U.S. PATENT DOCUMENTS

| 2019/0041856 | A1  | 2/2019  | Hippelein et al. |
| 2019/0079031 | A1* | 3/2019  | Safai .................... G01N 29/043 |
| 2020/0158664 | A1* | 5/2020  | Jespersen ............... G01B 11/24 |
| 2021/0072166 | A1* | 3/2021  | Uh ......................... G01N 23/046 |
| 2021/0370550 | A1* | 12/2021 | Zarecky ................. B29B 17/02 |
| 2022/0099602 | A1* | 3/2022  | Yang ...................... B33Y 30/00 |

FOREIGN PATENT DOCUMENTS

| JP | 2001-35687 A      | 2/2001  |
| KR | 10-1680602 B1     | 11/2016 |
| KR | 10-2017-0104762 A | 9/2017  |

* cited by examiner

*Primary Examiner* — Hoon K Song
(74) *Attorney, Agent, or Firm* — United One Law Group LLC; Kongsik Kim; Jhongwoo Peck

(57) ABSTRACT

A method of detecting a defect in a wind turbine blade uses a system that includes an X-ray generator, moved by a first transporting means, that generates X-ray to be irradiated to the wind turbine blade; an X-ray detector, moved by a second transporting means, that detects the X-ray generated by the X-ray generator and transmitted through the wind turbine blade; and a control unit. To detect a defect, the control unit divides virtually the wind turbine blade into a plurality of lengthwise sections based on a thickness profile thereof, receives a location of the X-ray generator, and controls output of the X-ray generator based on the location of the X-ray generator relative to the plurality of lengthwise sections. In particular, the output of the X-ray generator is decreased for a section among the plurality of lengthwise sections that is farther from a hub of the wind turbine blade.

4 Claims, 7 Drawing Sheets

SYSTEM AND METHOD FOR INSPECTING DEFECTS OF STRUCTURE BY USING X-RAY

CROSS-REFERENCE TO RELATED APPLICATIONS

The present application claims priority from Korean Application No. 10-2021-0111611 filed on Aug. 24, 2021, Korean Application No. 10-2021-0111615 filed on Aug. 24, 2021, and Korean Application No. 10-2021-0111620 filed on Aug. 24, 2021. The aforementioned applications are incorporated herein by reference in their entireties.

TECHNICAL FIELD

The present disclosure relates to a defect inspection system for structures using X-rays, and more particularly, to a system to inspect defects in large structures that are difficult for the inspector to manually inspect, such as defects in a wind turbine blade, using X-rays.

RELATED ART

The rotational axle of blades for wind power generation has a height of about 100 meters from sea level or from ground, and the blade length is as large as that. Since the blade rotates at a high speed, there is always a possibility of defects during the post-installation operation due to the accumulation of fatigue caused by the rotation. However, due to its huge size, there are many constraints on defect inspection.

Korean Patent Publication No. 10-2016-0067688 discloses a technology for defect inspection of a wind turbine blade, which is merely a technique for checking for defects after the blade is made and before installation, and it is not possible to inspect the blade for defects during the post-installation operation.

SUMMARY

Although a wind turbine blade is described herein as an example of a structure to which the present disclosure may be applied, it is merely for convenience of description, and the present disclosure is not limited to such an application and can be applied in any kinds of large structures.

An aspect of the present disclosure provides a defect inspection system, which may include an X-ray generator that generates X-ray to be irradiated to a structure, and an X-ray detector that detects the X-ray generated by the X-ray generator and transmitted through the structure. In particular, the X-ray generator may be configured to be moved by a first transporting means, and the X-ray detector may be configured to be moved by a second transporting means. The system may also include a control unit configured to control and operate the first transporting means and the second transporting means.

The system may further include an inspection record receiving unit that receives information detected by the X-ray detector, and a defect determination unit that determines presence of a defect in the structure based on the information received by the inspection record receiving unit.

In some embodiments, the X-ray generator may be provided in plurality.

In some embodiments, the first transporting means may be configured to transport the X-ray generator in a back-and-forth path along the structure.

The first transporting means, the second transporting means, or both may be implemented as at least one of a drone, a rail, a robot, or a Jimmy Jib.

The structure may be a wind turbine blade.

Further, the X-ray generator may include an X-ray tube to irradiate the X-ray; a high voltage generator that applies a high voltage to the X-ray tube to generate the X-ray; a first shielding member that shields the X-ray tube except for a part that irradiates the X-ray; and a second shielding member that shields a part that overlaps with the X-ray tube in the high voltage generator.

A related aspect of the present disclosure provides a method of detecting a defect in a structure, which may include transmitting, by a control unit, a control command to a first transporting means to cause the first transporting means to be transported to a first location, wherein an X-ray generator that is transported by the first transporting means generates X-ray to be irradiated to a structure from the first location; transmitting, by the control unit, a control command to a second transporting means to cause the second transporting means to be transported to a second location, wherein an X-ray detector that is transported by the second transporting means detects the X-ray irradiated by the X-ray generator from the first location and transmitted through the structure; receiving, by an inspection record receiving unit, an X-ray image from the X-ray detector; and determining, by a defect determination unit, presence of a defect in the structure based on the received X-ray image.

In some embodiments, the method may further include virtually dividing, by the control unit, the structure into a plurality of sections based on thickness of the structure; receiving, by the control unit, the first location of the X-ray generator; and controlling, by the control unit, output of the X-ray generator based on the first location of the X-ray generator relative to the plurality of sections.

The structure may be a wind turbine blade. In some such embodiments, the wind turbine blade may be virtually divided into a plurality of lengthwise sections, and the output of the X-ray generator may be decreased for a section among the plurality of lengthwise sections that is farther from a hub of the wind turbine blade.

In some embodiments, the method may include receiving, by the control unit, the first location of the X-ray generator; and controlling, by the control unit, a tube voltage and a tube current of the X-ray generator to allow output of the X-ray generator to gradually decrease as the X-ray generator moves away from a hub of the wind turbine blade.

In some embodiments, the control unit may be configured to control the first transporting means to transport the X-ray generator in a back-and-forth path along the blade.

In response to the defect determination unit detecting the presence of defect in the structure, the method may further perform transmitting, by the control unit, a control command to the first transporting means to cause the first transporting means to be transported to a third location, which has a same height as the first location; transmitting, by the control unit, a control command to capture another X-ray image with the X-ray generator disposed at the third location; transmitting, by the control unit, a control command to the first transporting means to cause the first transporting means to be transported to a fourth location, which has the same height as the first location and is in an opposite side from the third location with respect to the first location; transmitting, by the control unit, a control command to capture yet another X-ray image with the X-ray generator disposed at the fourth location; and determining, by the defect determination unit, a depth (D) of the defect.

In particular, the depth (D) of the defect may be determined based on a distance (A) between the third location and the fourth location, a translation distance (B) of the defect appearing on the X-ray images of the X-ray detector, and a perpendicular separation distance (C) between the X-ray generator and the X-ray detector by using the following formula:

$$D = \frac{BC}{A+B}.$$

Further, a non-transitory computer-readable recording medium may store computer program instructions that, when executed, perform the above-described method.

In a related aspect, a method of detecting a defect in a wind turbine blade using a system that includes an X-ray generator that generates X-ray to be irradiated to the wind turbine blade, the X-ray generator being moved by a first transporting means; an X-ray detector that detects the X-ray generated by the X-ray generator and transmitted through the wind turbine blade, the X-ray detector being moved by a second transporting means; and a control unit is provided. The method may include dividing virtually, by the control unit, the wind turbine blade into a plurality of lengthwise sections based on a thickness profile thereof; receiving, by the control unit, a location of the X-ray generator; and controlling, by the control unit, output of the X-ray generator based on the location of the X-ray generator relative to the plurality of lengthwise sections. In particular, the output of the X-ray generator may be decreased for a section among the plurality of lengthwise sections that is farther from a hub of the wind turbine blade.

In another related aspect, a method of determining a depth of a defect in a structure using a system that includes an X-ray generator that generates X-ray to be irradiated to the structure, the X-ray generator being moved by a first transporting means; an X-ray detector that detects the X-ray generated by the X-ray generator and transmitted through the structure, the X-ray detector being moved by a second transporting means; a control unit; an inspection record receiving unit; and a defect determination unit is provided. The method may include transmitting, by the control unit, a control command to the first transporting means to cause the first transporting means to be transported to a first location; transmitting, by the control unit, a control command to the second transporting means to cause the second transporting means to be transported to a second location, from which the X-ray detector is capable of detecting the X-ray irradiated by the X-ray generator and transmitted through the structure; transmitting, by the control unit, a control command to the X-ray generator to cause the X-ray generator to irradiate the X-ray from the first location; receiving, by the inspection record receiving unit, an X-ray image from the X-ray detector; determining, by the defect determination unit, presence of defect in the structure based on the received X-ray image; in response to the defect determination unit detecting the presence of defect in the structure, transmitting, by the control unit, a control command to the first transporting means to cause the first transporting means to be transported to a third location, which as a same height as the first location; transmitting, by the control unit, a control command to capture a second X-ray image with the X-ray generator disposed at the third location; transmitting, by the control unit, a control command to the first transporting means to cause the first transporting means to be transported to a fourth location, which has the same height as the first location and is in an opposite direction from the third location with respect to the first location; transmitting, by the control unit, a control command to capture a third X-ray image with the X-ray generator disposed at the fourth location; and determining, by the defect determination unit, a depth (D) of the defect based on a distance (A) between the third location and the fourth location, a translation distance (B) of the defect appearing on the X-ray images of the X-ray detector, and a perpendicular separation distance (C) between the X-ray generator and the X-ray detector by using the following formula:

$$D = \frac{BC}{A+B}.$$

According to the present disclosure, defects in large structures such as wind turbine blades may be detected with an X-ray device. Further, during the inspection, the X-ray output may be controlled for each section of the structures.

DETAILED DESCRIPTION

Figure 1:
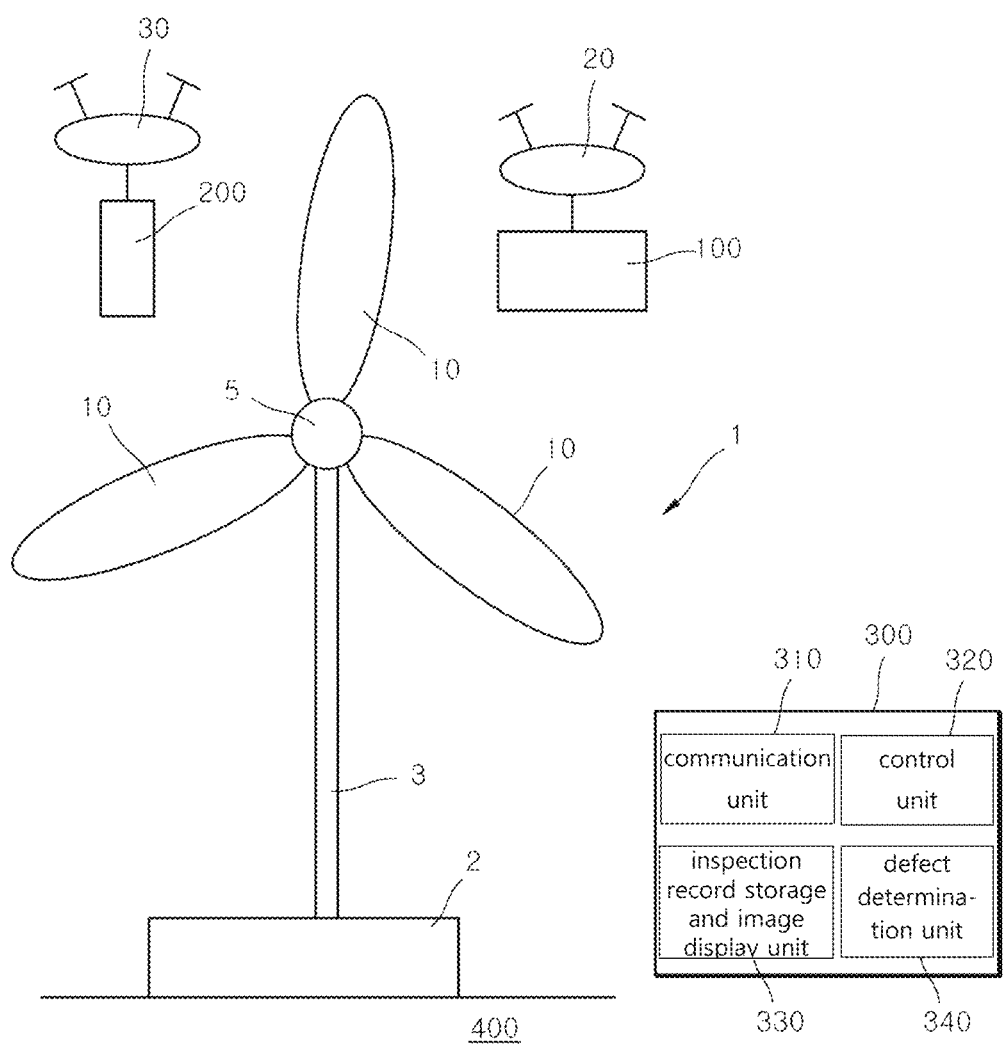
FIG. 1 conceptually depicts a structure inspection system according to the present disclosure.

Hereinbelow, the present invention will be described in detail with reference to the accompanying drawings.

This specification describes only the minimum components necessary for describing the present invention, and does not mention components that are not essential to the nature of the present disclosure. Further, it should not be construed in an exclusive sense that includes only the components mentioned, and it should be construed in a non-exclusive sense that may include other components that are not mentioned.

The terms "first," "second," or similar expressions as used herein are used to distinguish between the same or similar components or to distinguish the names of the steps constituting the present disclosure, and may not necessarily mean order or plurality.

Herein, the term "or" is defined to include at least a portion of the listed elements.

The control method of an X-ray device or the like and defect determination method using the same according to the present disclosure may be performed by an electronic computing device such as a computer, tablet PC, mobile phone, portable computing device, stationary computing device, and the like. It should also be understood that one or more methods or embodiments of the present disclosure may be executed by at least one processor. The processor may be installed in a computer, tablet PC, mobile device, portable computing device, and the like. The memory configured to store computer program instructions may be installed on such a device so that the program may be specifically programmed for the processor to execute the stored program instructions to execute one or more processes as described herein. In addition, it should be understood that the information and methods described herein and the like may be implemented by a computer, tablet PC, mobile device, portable computing device, or the like, including one or more additional components and processors. In addition, the control logic may be implemented in a non-volatile computer-readable medium including program instructions executable by the processor, controller/control unit, and the like. Examples of the computer-readable media include, but are not limited to, ROM, RAM, CD-ROM, magnetic tape, floppy disk, flash drive, smart card, optical data storage device, and the like. In addition, the computer-readable recording medium may be distributed over networked computers and stored and executed in a manner in which the computer-readable medium is distributed, for example, by a remote server or a controller area network (CAN).

Exemplary embodiments described herein provide a general understanding of the structure, function, fabrication, and principles of use and method of the apparatus disclosed herein. One or more of these embodiments are shown in the accompanying drawings. Those skilled in the art will appreciate that the devices and methods described herein and shown in the accompanying drawings are non-limiting and exemplary embodiments and that the scope of rights of the present disclosure is defined by the scope of the claims. The features shown and described in connection with one exemplary embodiment may also be combined with features of other embodiments. Such modifications or variations are intended to be included in the scope of the present disclosure.

FIG. 1 shows a conceptual diagram of a structure inspection system according to the present disclosure. Although the present specification describes an example in which the structure to be inspected is a wind turbine blade, the structure to be inspected is not limited thereto.

The inspection target structure 1 may include a base 2 disposed at sea level or on the ground 400, a tower 3 supported by the base 2, a hub 5 that is the center of the blade rotation axis, and a blade 10 that extends radially from the hub 5.

The structure inspection system according to the present disclosure may include an X-ray generator 100 that is supported and transported by a first transporting means 20 so that the X-ray may be irradiated to the structure 1, an X-ray detector 200 that is supported and transported by a second transporting means 30 to detect the X-ray that has penetrated through the structure 1, in particular, the blade 10, and an integration system 300 that receives information detected by the X-ray detector 200 and determines whether a defect is present.

It is desirable that the basic specifications of the X-ray generator 100 conform to the specifications of medical X-ray devices, rather than general industrial X-ray devices. Although the industrial X-ray devices typically have a low power consumption, since they are designed for transmission through a thicker subject and for longer inspection time, the industrial X-ray devices have disadvantages that they are relatively larger and heavier. Accordingly, they are less suitable to be transported by a transporting means as in the present disclosure. Medical X-ray devices, on the other hand, generate high tube current because they are intended for biohistography, and the volume of the high-voltage generator is relatively small compared to industrial X-ray devices, and they can be more easily made light-weight.

The first transporting means 20 and the second transporting means 30 may be implemented as drones, or may be implemented as stationary transporting means such as a rail system or a Jimmy Jib, which may support and move the X-ray generator 100 and the X-ray detector 200. Alternatively, they may be a robot that supports the X-ray generator 100 and the X-ray detector 200 and moves along the surface of the blade 10. The type of the transporting means is not particularly limited. Each of the first transporting means 20, the second transporting means 30, the X-ray generators 100, and the X-ray detectors 200 may be provided in plurality.

The integration system 300 may include a communication unit 310, a control unit 320, an inspection record storage and image display unit 330, and a defect determination unit 340. Although the components of the integration system 300 are functionally separated for convenience of explanation, in practice they may be configured as software on a single piece of hardware, or may be configured as separate cloud systems. Each component may be physically separate or physically integrated. In addition, the components of the integration system 300 shown in FIG. 1 may be further subdivided and configured based on the function. For example, the control unit 320 may be subdivided into a transporting means control unit and an X-ray generator control unit.

The communication unit 310 may perform data communication with the first transporting means 20, the second transporting means 30, the X-ray generator 100, and the X-ray detector 200. Data communication is preferably wireless communication, but wired communication is also possible.

The control unit 320 may perform functions of controlling the operation of the first transporting means 20, the second transporting means 30, the X-ray generator 100, and the X-ray detector 200.

The inspection record storage and image display unit 330 may store the information received by the communication unit 310 from the X-ray detector 200 and may display the captured images.

The defect determination unit 340 may determine a defect in the structure based on the captured images. The determination of a structural defect based on the captured image may be performed through an artificial intelligence (AI) algorithm.

Figure 2:
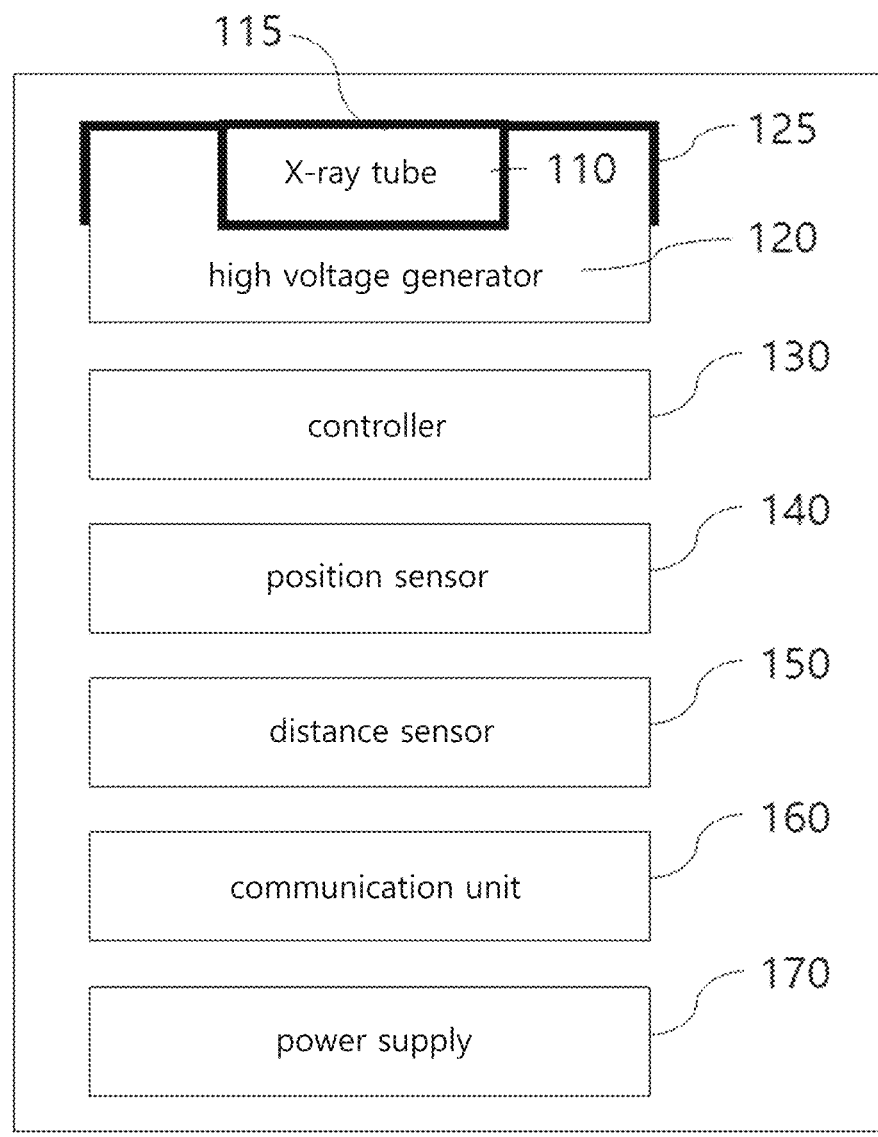
FIG. 2 shows a block diagram of an X-ray generator for a structure inspection system according to the present disclosure.

FIG. 2 shows a block diagram of the X-ray generator 100 according to the present disclosure. The X-ray generator 100 may include a high voltage generator 120 that includes an X-ray tube 110, a controller 130, a position sensor 140, a distance sensor 150, a communication unit 160, and a power supply 170. The X-ray tube 110 is a component that may generate X-rays by a high voltage generated by the high voltage generator 120 and may irradiate the X-rays to the outside. According to the present disclosure, the X-ray tube 110 may be shielded with a first shielding member 115 that is made of, for example, lead, except for the portion in which the X-ray is irradiated. The high voltage generator 120 may be shielded by a second shielding member 125 only around the periphery in which the X-ray tube 110 is disposed. In conventional X-ray generators, the entire high voltage generator, which has a relatively large size, is shielded with a shielding member. However, in the X-ray generator according to the present disclosure, the X-ray tube 110, which has a relatively small size, may be shielded with the first shielding member 115, and in the high voltage generator 120, only around the X-ray tube 110 may be shielded with the second shielding member 125. As such, it can be made significantly lighter than conventional X-ray generators, thereby facilitating easier transportation by the transporting means.

The controller 130 may be configured to receive a control command from the control unit 320 of the integration system 300 and, based on the control command, may control the tube voltage, tube current, irradiation time, or the like of the X-ray generator 100.

The position sensor 140 may be a sensor that detects the position of the X-ray generator 100. The position sensor 140 may be provided with the first transporting means 20 rather than the X-ray generator 100. In this case, the position of the X-ray generator 100 may be determined based on the position detected by the position sensor 140.

The distance sensor 150 may be a sensor that detects the distance between the blade 10 and the X-ray generator 100. The distance sensor 150 may utilize a known distance sensor, such as an ultrasonic sensor or an infrared sensor. The distance between the blade 10 and the X-ray generator 100 may be preferably 50 cm to 1.5 m, and may be adjusted differently depending on the configuration (thickness or size, etc.) of the structure. The first transporting means 20 may be controlled such that the X-ray irradiated by the X-ray generator 100 while maintaining a predetermined distance from the blade 10 may penetrate the blade 10 for a predetermined amount of time. The distance sensor 150 may be integrated with the position sensor 140.

The communication unit 160 may receive a command of the control unit 320 and may transmit it to the controller 130.

The power supply 170 may utilize a DC-type power supply, in which case the ancillary components for voltage stabilization such as EMI filters and smoothing circuits can be omitted, thereby enabling miniaturization and weight reduction of the X-ray generator.

Figure 3:
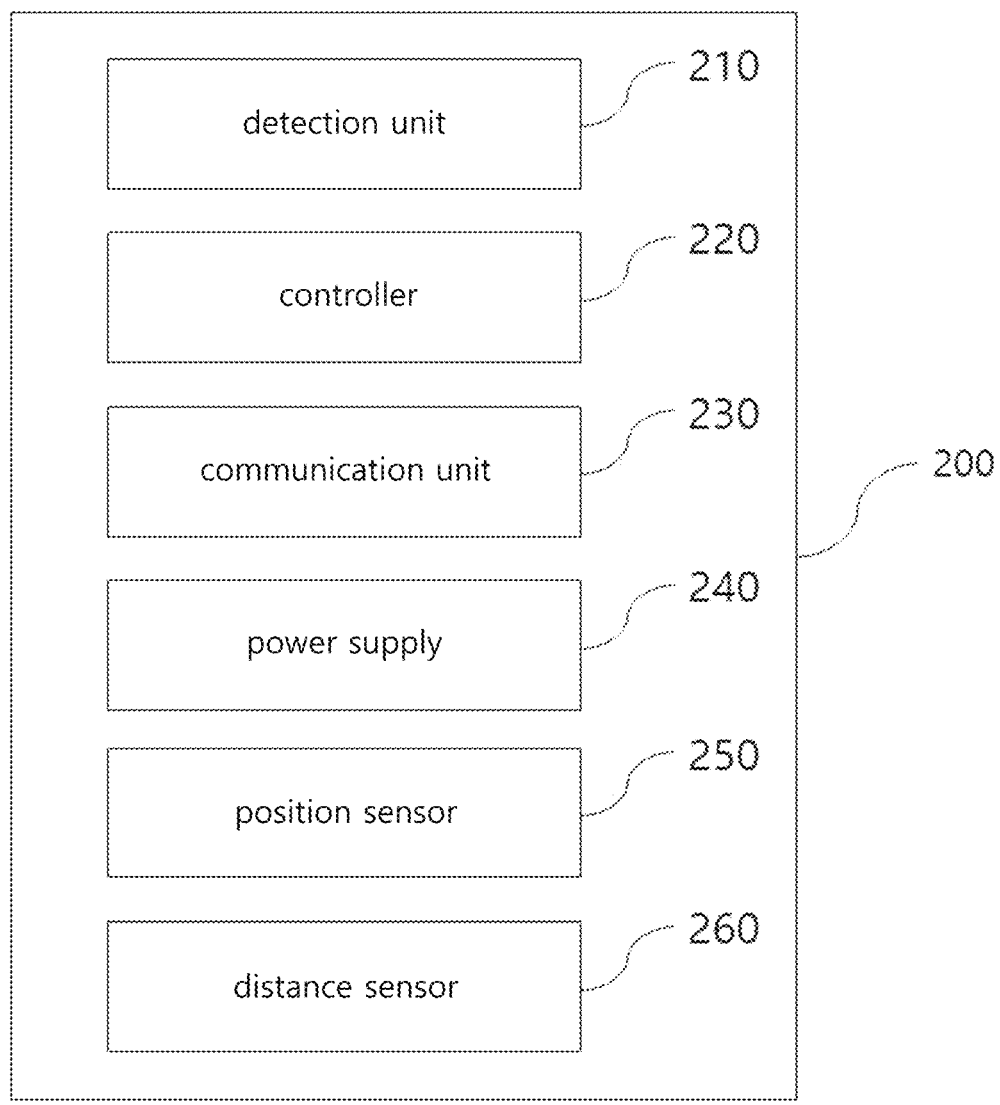
FIG. 3 shows a block diagram of an X-ray detector for a structure inspection system according to the present disclosure.

FIG. 3 shows a block diagram of the X-ray detector 200. The X-ray detector 200 may include a detection unit 210, a controller 220, a communication unit 230, a power supply 240, a position sensor 250, and a distance sensor 260.

The detection unit 210 may detect the X-ray that is irradiated on the blade 10 by the X-ray generator 100 and transmitted therethrough. The controller 220 may receive a command from the control unit 320 of the integration system 300 to control the operation of the X-ray detector 200.

The communication unit 230 may perform data communication with the integration system 300 and may transmit the X-ray image detected by the detection unit 210 to the integration system 300.

A DC-type power supply may also be used for the power supply 240 of the X-ray detector 200, in which case the ancillary components for voltage stabilization such as EMI filters and smoothing circuits can be omitted, thereby enabling miniaturization and weight reduction the X-ray detector.

The position sensor 250 may be a sensor that detects the position of the X-ray detector 200. The position sensor 250 may be provided with the second transporting means 30 rather than the X-ray detector 200. In this case, the position of the X-ray detector 200 may be determined from the position detected by the position sensor 250.

The distance sensor 260 may be a sensor that detects the distance between the blade 10 and the X-ray detector 200. The distance sensor 260 may use a known distance sensor, such as an ultrasonic sensor or an infrared sensor. The distance between the blade 10 and the X-ray detector 200 may be preferably 10 cm to 1.5 m, and the distance may be adjusted differently depending on the configuration (thickness, size, etc.) of the structure.

Depending on the measured distance, the second transporting means 30 may be operated to maintain said distance based on the commands of the control unit 320 of the integration system. The distance sensor 260 may be integrated with the position sensor 250.

Figure 4:
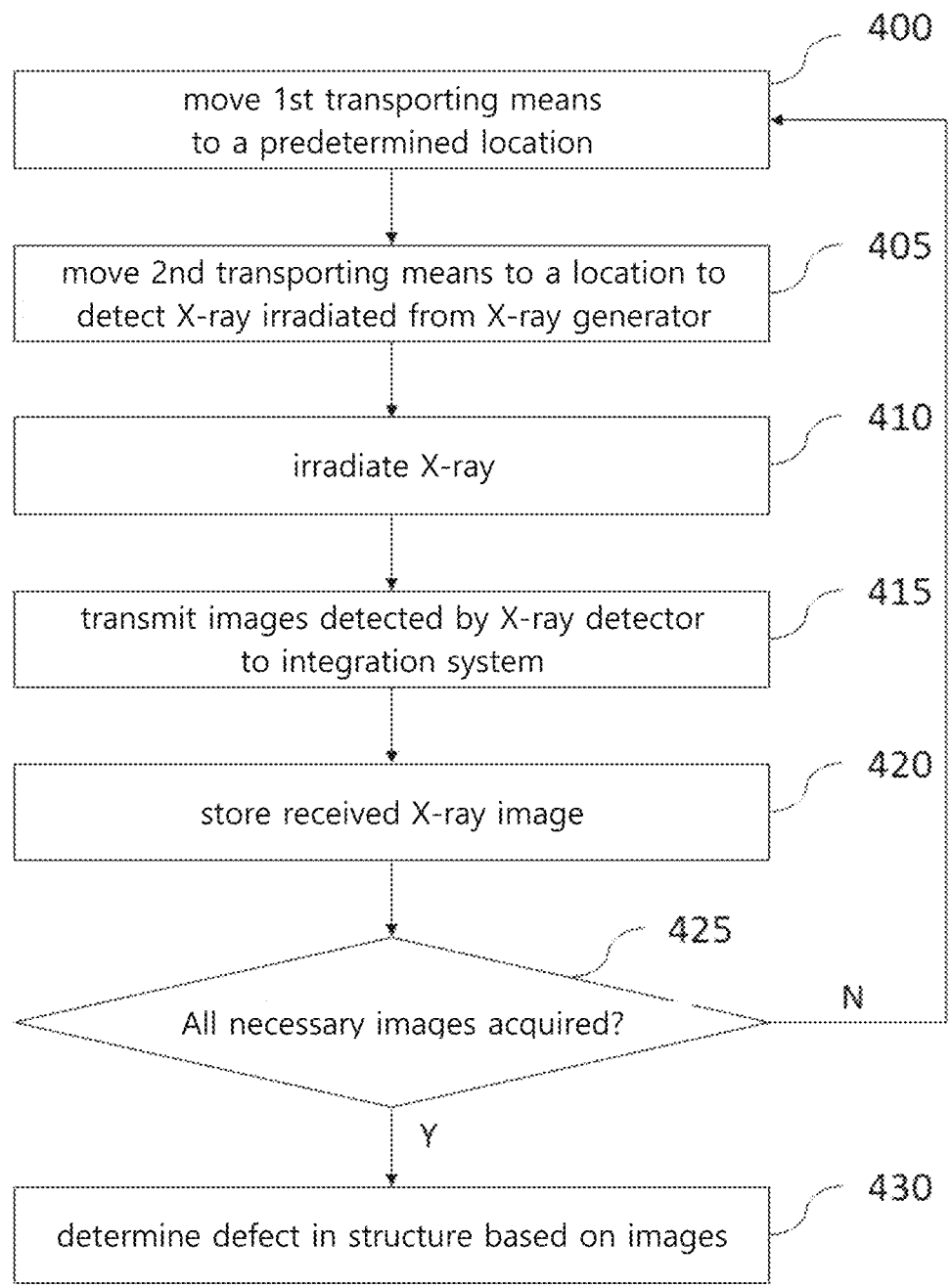
FIG. 4 shows a flowchart of a structure inspection method according to the present disclosure.

Referring to FIG. 4, a method of inspecting structural defects according to the present disclosure will be described.

In step 400, the control unit 320 may be configured to move the first transporting means 20 to a predetermined position. The control unit may be configured to preset a virtual coordinate system (e.g., a virtual coordinate system having a grid form that includes the structure) that includes the inspection target structure, e.g., the blade 10, and may be configured to move the first transporting means 20 to the location where the X-ray generator 100 can project the X-rays to the portion of the structure to be imaged.

Subsequently, the second transporting means 200 may be moved to a position at which the X-ray that is irradiated by the X-ray generator 100 and transmitted through the structure 10 can be detected. (Step 405)

The control unit 320 may be configured to issue an X-ray irradiation command to the X-ray generator 100 through the communication unit 310 to cause the X-ray generator 100 to project X-rays onto the structure 10 (Step 410). With regard to control variables such as a tube voltage and tube current that are required to project X-rays, the control unit 320 may be configured to transmit directly to the X-ray generator 100, or the controller 130 included in the X-ray generator 100 may be configured to project X-rays with a tube voltage, tube current, or the like, that are preset for each position.

The X-ray detector 200 may transmit the detected X-ray image to the integration system 300 (step 415), and the integration system 300 may store and display the received X-ray image in the inspection record storage and image display unit 330 (Step 420).

In step 425, it may be determined whether all of necessary images have been obtained, and if not, it may return to step 400 to drive the first transporting means 20 to a predetermined next position and may repeat the aforementioned process. In particular, the predetermined next position may refer to a location that has been predetermined so that the X-ray image required to detect a defect may be obtained in coordination with the X-ray image obtained at the position of the previous step. For example, if the dimension of the X-ray detector 200 is 43 cm×43 cm, it may be necessary to change positions and take an average of three (3) shots to obtain an X-ray image for a unit area of 1 m×1 m. Further, if the positions of the first transporting means 20 and the second transporting means 30 need to be changed as described later below to calculate the depth of the defect, it may be moved to a location, which is necessary for determining the depth of the defect. The X-ray image required for defect detection may be an image of the entire structure 10 or may be an image of some predetermined section, the range of which is not limited.

Upon acquiring all of the necessary X-ray images, a defect of the structure 10 may be determined based on the X-ray images (step 430). Structural defect determination may be performed using one or more AI algorithms.

In the case of the wind turbine blade 10, the defect of the blade may be determined by checking the application ratio of epoxy used as an adhesive for fixing the structure, for example, spar cap, or the like, inside the blade. For example, as the blade 10 is imaged with X-rays, the epoxy application ratio may be displayed as a contrast ratio (e.g., sharpness) with respect to the grayscale in the image. By quantifying the grayscale values, setting the range of grayscale values depending on defect types, and recording/managing a large verification data, the AI may be trained to generate an AI model.

When the AI model is thus generated, the grayscale values may be derived through image analysis of the X-ray images of the structure 10, and the values may be inputted to the AI model to have it determine whether there is a defect. According to an embodiment of the present disclosure, the portion identified as a defect site may be visualized by displaying it in a different color than the surroundings.

Types of defects other than epoxy application ratio, such as cracks and the like, may also be quantified, and AI models may be generated and used for such defect determination.

Figure 5:
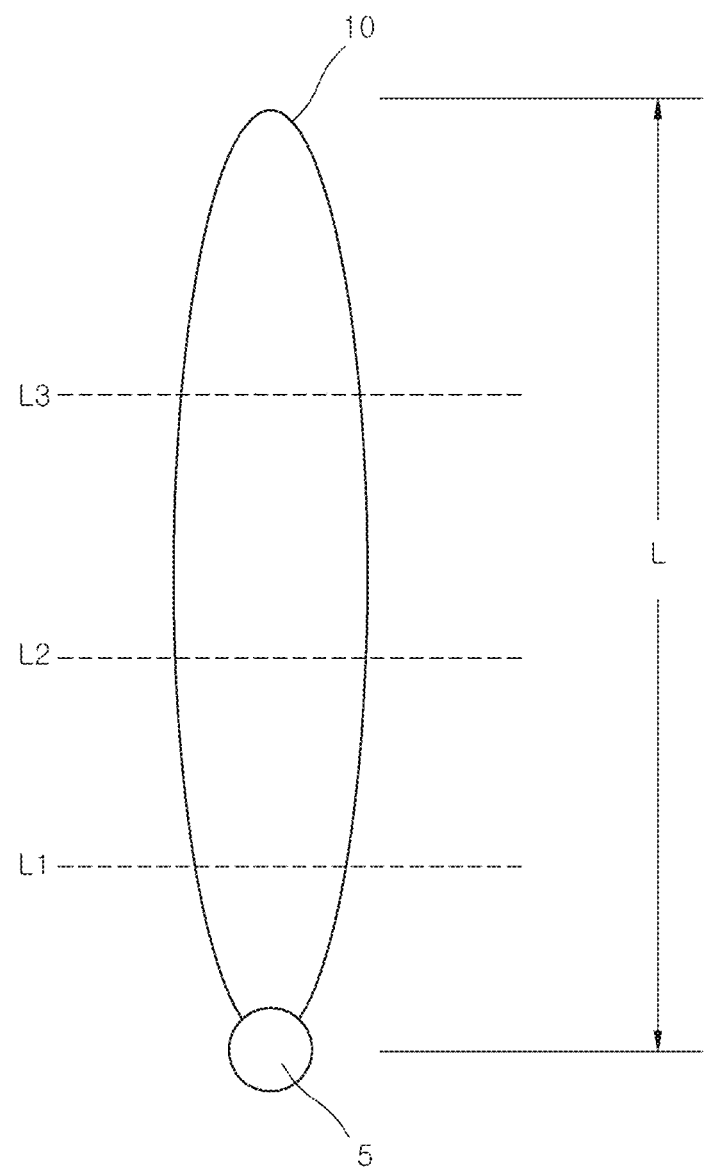
FIG. 5 depicts sections on a blade to describe changing the X-ray output for each section in a structure inspection system according to the present disclosure.

Hereinbelow, with reference to FIG. 5, the X-ray irradiation method using the X-ray generator 100 of the present disclosure will be described.

The X-ray irradiation method according to the present disclosure may divide the blade 10 into a plurality of sections along the length and may control the output by controlling the tube voltage and the tube current differently for each section.

If the length of the blade 10 is L, it may be divided into a first section that spans from the hub 5 to a first height L1, a second section that spans from the first height L1 to a second height L2, a third section that spans from the second height L2 to a third height L3, and a fourth section that spans from the third height L3 to the tip, and the tube voltage and tube current may be controlled differently for each section. Although four sections are shown in FIG. 5, the number and height of sections may be set differently as needed.

For example, the first height L1 may be set to 20% of the total length, the second height L2 may be set to 40% of the total length, and the third height L3 may be set to 70% of the total length.

With the heights set as the above, in the first section, the tube voltage and tube current may be controlled to produce an output of about 90% of the maximum X-ray output of the X-ray generator 100; in the second section, the tube voltage and tube current may be controlled to produce an output of about 70% of the maximum X-ray output; in the third section, the tube voltage and tube current may be controlled to produce an output of about 40% of the maximum X-ray output; in the fourth section, the tube voltage and tube current may be controlled to produce an output of about 20% of the maximum X-ray output. Since the thickness of the blade 10 is the largest on the hub 5 side and becomes smaller as it moves towards the tip, the tube voltage and tube current may be controlled so that the X-ray output decreases as it moves away from the hub 5. However, such an output profile is merely an example, and the present disclosure is not limited thereto. Instead of controlling the tube voltage and tube current by discrete sections, the tube voltage and tube current may be controlled so that they gradually decrease continuously as it goes toward the tip of the blade 10.

Figure 6:
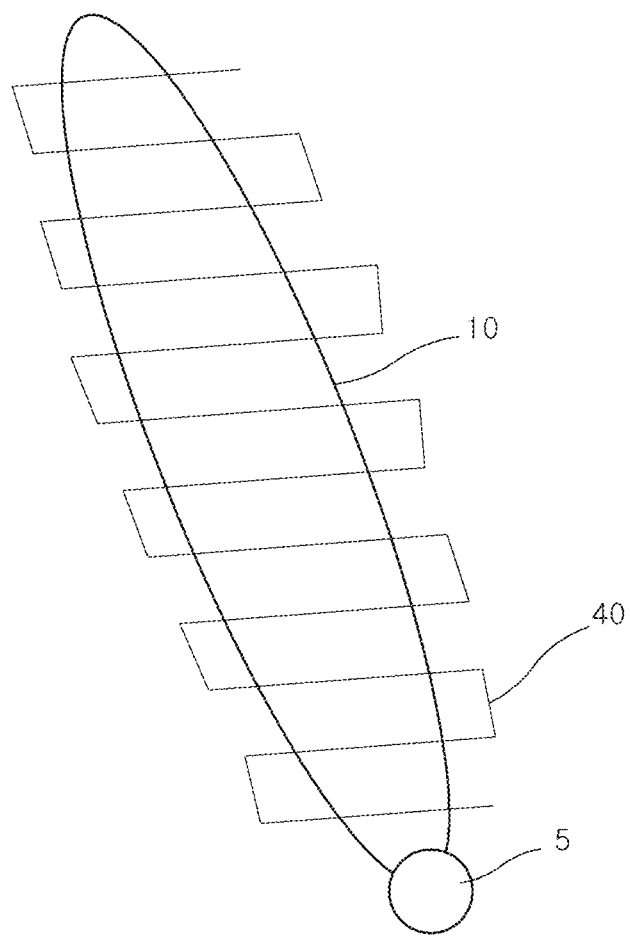
FIG. 6 illustrates preferred movement path of the X-ray generator for a structure inspection system according to the present disclosure.

The first transporting means 20 and the second transporting means 30 may move the X-ray generator 100 and the X-ray detector 200 while moving in a "back-and-forth" path along the longitudinal direction of the blade 10 as shown in FIG. 6.

The starting point of the "back-and-forth" path may be a point proximate to the hub 5 or a farthest point from the hub 5, depending on the location of the blade. Where the power supplies 170 and 240 mounted on the X-ray generator 100 and the X-ray detector 200, respectively, are lithium-ion batteries or polymer batteries, they discharge rapidly with usage from the fully charged state down to about 80%, and discharges with a less steep slope from about 80% to about 20%. Since the greater the distance for the data communication, the greater the power consumption, it may be important to keep the initial transmission and reception distance minimal in order to avoid or reduce the initial rapid discharge.

Where the integration system 300 is disposed proximate to sea level or the ground, and the blade 10 is facing upwards as shown in FIG. 6, the starting point of the "back-and-forth" path may be set to a point proximate to the hub 5. If the blade 10 is facing the opposite direction from FIG. 6, the starting point of the "back-and-forth" path may be set to a farthest point from the hub 5 to minimize the initial transmission and reception distance. Thus, the starting point may be set differently depending on the relative location of the integration system 300.

The X-ray generator 100 or the X-ray detector 200 may deviate from the imaging path and return to a predetermined position during the X-ray imaging process for replacement of the battery or maintenance of equipment in the first transporting means 20, the second transporting means 30, the X-ray generator 100, or the X-ray detector 200. For such cases, the "back-and-forth" path may be advantageous for returning to the last imaging position after the battery replacement or maintenance. In addition, in order to prevent duplicate imaging, and to collect and combine the captured images more easily, the 'back-and-forth" path is advantageous.

Further, the locations of the X-ray generator 100 and the X-ray detector 200 according to the present disclosure may establish a hypothetical coordinate system in the grid form that includes the structure 10 and may be identified by each node of that coordinate system. However, other coordinate systems may be used without deviating from the technical spirit of the present disclosure.

Figure 7:
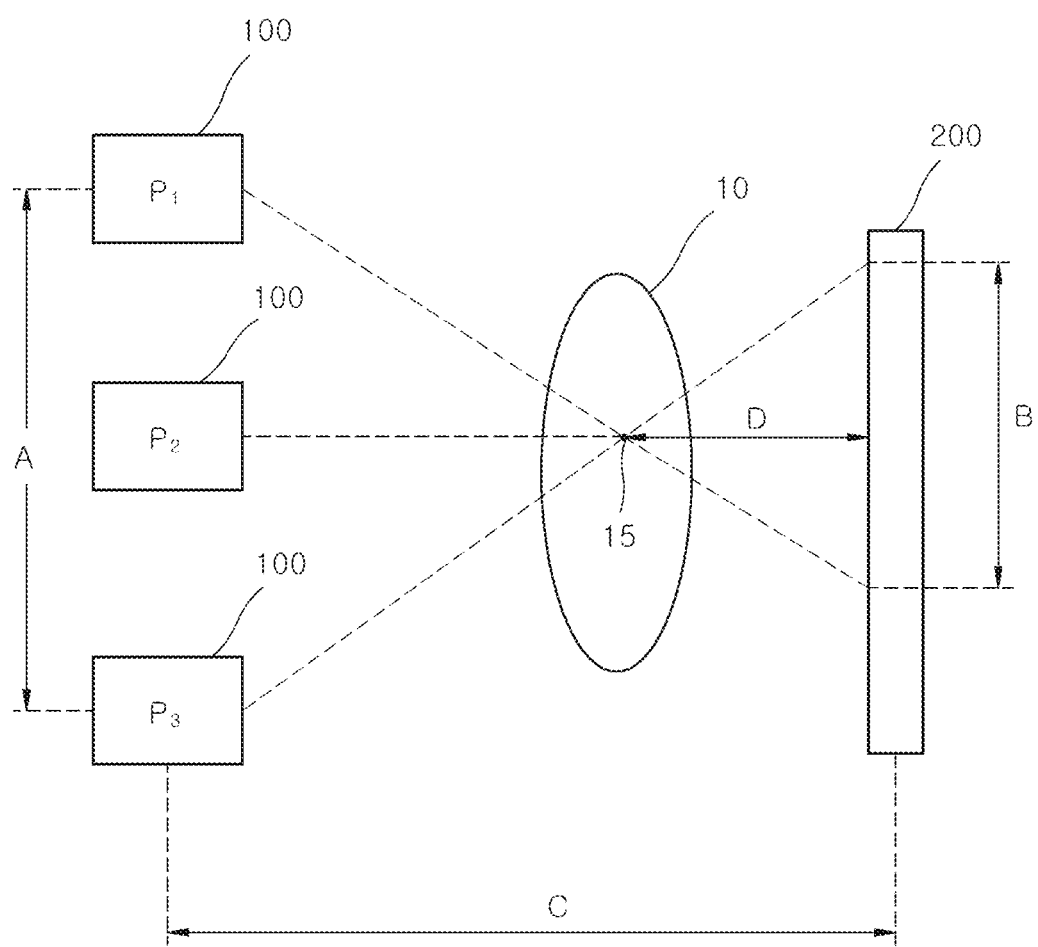
FIG. 7 describes a method of calculating the depth of a defect using a structure inspection system according to the present disclosure.

Hereinbelow, a method of detecting the depth of structural defect according to the present disclosure will be described with reference to FIG. 7, which is a top view along the longitudinal direction of the blade 10 (with the blade 10 oriented upward).

The depth of the defect 15 may be determined in response to the X-ray that is projected by the X-ray generator 100 onto the blade 10 at the second position P2 is detected by the X-ray detector 200, the captured image is transmitted to the integration system 300 and displayed in the inspection record storage and image display 330, and then the defect determination unit 340 determines that a defect is present based on the image.

As described in connection with FIG. 4, the image for determining a defect in the structure may be a combined image corresponding to a predetermined unit area, an image of the structure as a whole, or a single image captured at the corresponding location.

The control unit 320 may be configured to cause the X-ray generator 100 to be moved to the first position P1, which has the same height as the second position P2, to capture an image of the defect 15, and then to transmit the captured image to the integration system 300.

Subsequently, the control unit 320 may be configured to cause the X-ray generator 100 to be moved to a third position P3, which has the same height as and opposite from the first position P1 with respect to the second position P2, to capture an image of the defect 15, and then to transmit the captured image to the integration system 300.

If a travel distance between the first position P1 and the third position P3 for the X-ray generator 100 is A, a translation distance of the defect 15 appearing on the image of the X-ray detector 200 is B, and a perpendicular separation distance between the X-ray generator 100 and the X-ray detector 200 is C, a distance D between the X-ray detector 200 and the defect 15 may be calculated as follows:

$$D = \frac{BC}{A+B}$$ [Equation 1]

Through this method, the depth of the detected defect 15 (i.e. distance from the X-ray detector 200) may be calculated. The depth calculation may be performed by the defect determination unit 340 of the integration system 300, or may be performed by a separate electronic computing device upon receipt of the data.

Although the present disclosure has been described with reference to the accompanying drawings, the scope of rights of the present disclosure is determined by the claims presented below and should not be construed as being limited to the foregoing embodiments and/or drawings. Further, it should be clearly understood that the improvements, alterations, and modifications of the invention described in the claims, which are obvious to those skilled in the art, are also included in the scope of the rights of the present disclosure.

What is claimed is:

1. A method of detecting a defect in a wind turbine blade using a system comprising an X-ray generator that generates X-ray to be irradiated to the wind turbine blade, the X-ray generator being moved by a first transporting means; an X-ray detector that detects the X-ray generated by the X-ray generator and transmitted through the wind turbine blade, the X-ray detector being moved by a second transporting means; and a control unit, wherein the method comprises:

dividing virtually, by the control unit, the wind turbine blade into a plurality of lengthwise sections based on a thickness profile thereof;

receiving, by the control unit, a location of the X-ray generator; and controlling, by the control unit, output of the X-ray generator based on the location of the X-ray generator relative to the plurality of lengthwise sections, wherein the output of the X-ray generator is decreased for a section among the plurality of lengthwise sections that is farther from a hub of the wind turbine blade.

2. The method of claim 1, wherein in the controlling the output of the X-ray generator, the control unit is configured to control a tube voltage and a tube current of the X-ray generator to allow the output of the X-ray generator to stepwise or gradually decrease as the X-ray generator moves away from the hub of the wind turbine blade.

3. The method of claim 2, further comprising:

controlling, by the control unit, the first transporting means to transport the X-ray generator in a back-and-forth path along the wind turbine blade.

4. A non-transitory computer-readable recording medium comprising computer program instructions that, when executed, perform the method of claim 1.

* * * * *